(No Model.)
L. R. HOLLINGSWORTH.
INSTRUMENT FOR MEASURING LENGTHS, GRADES, AND DIRECTIONS OF LINES.
No. 349,590. Patented Sept. 21, 1886.
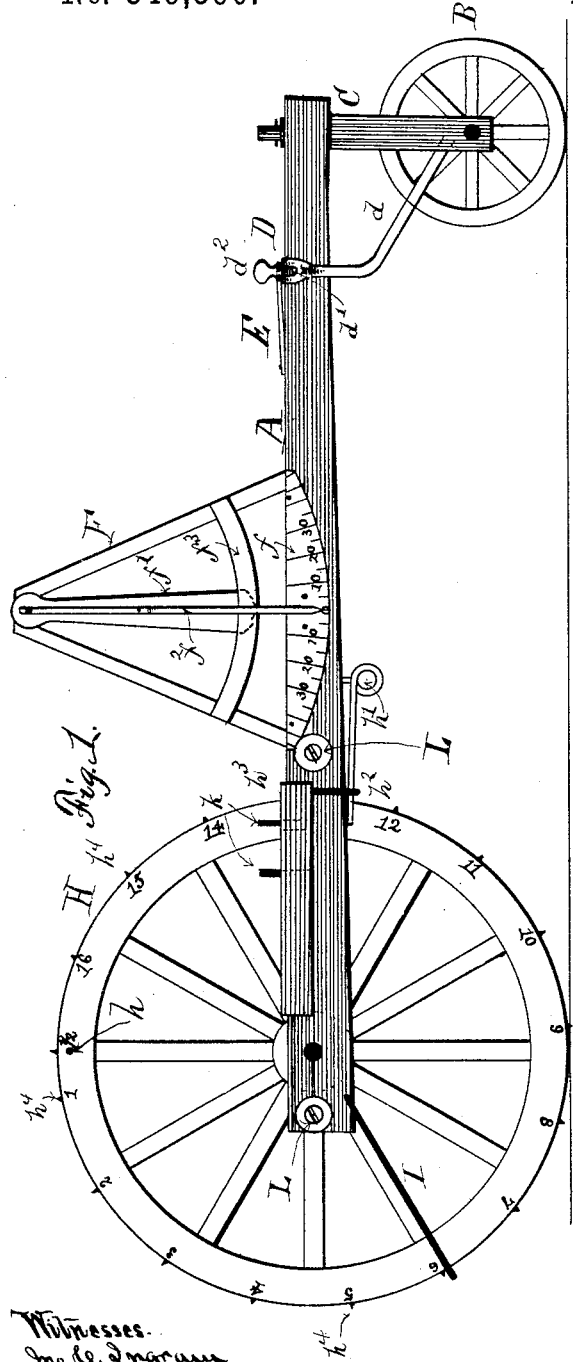
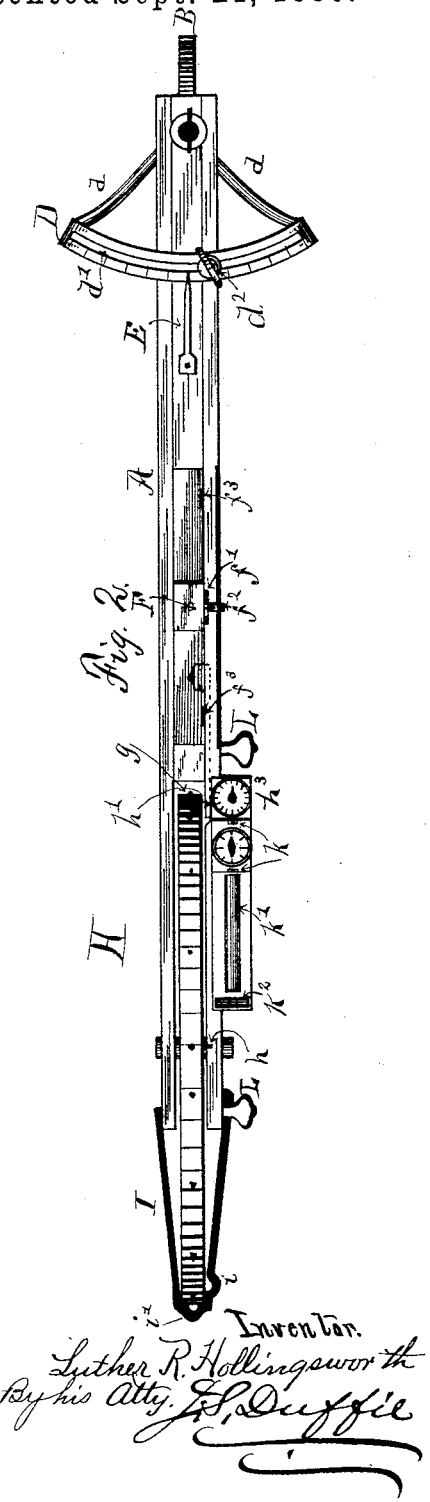
Witnesses.
Jno. C. Ingram
J. A. Brereton
Inventor.
Luther R. Hollingsworth
By his Atty. J. S. Duffie
N. PETERS. Photo-Lithographer, Washington, D. C.

UNITED STATES PATENT OFFICE.

LUTHER R. HOLLINGSWORTH, OF EMMET, ARKANSAS.

INSTRUMENT FOR MEASURING LENGTHS, GRADES, AND DIRECTIONS OF LINES.

SPECIFICATION forming part of Letters Patent No. 349,590, dated September 21, 1886.

Application filed May 18, 1886. Serial No. 202,520. (No model.)

*To all whom it may concern:*

Be it known that I, LUTHER R. HOLLINGSWORTH, a citizen of the United States, residing at Emmet, in the county of Nevada and State of Arkansas, have invented certain new and useful Improvements in Surveying, Grading, Leveling, and Measuring Land; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has relation to surveying, grading, leveling, and land-measuring instruments; and it consists in the novel construction and arrangement of its parts, as hereinafter fully set forth in the claims.

In the accompanying drawings, Figure 1 is a side elevation of my invention, and Fig. 2 is a top plan view of the same.

My invention is described as follows:

A is the horizontal beam upon which the machine is built.

B is the front guiding-wheel. It is journaled in an upright fork, C, which is pivoted in the front end of the beam A.

D is a quadrant divided into degrees. It works horizontally on the upper face of the beam A, and is secured to the upright beam C by the two arms $d$ $d$. This quadrant has in it a slot, $d'$, the entire length of the quadrant, through which a thumb-screw, $d^2$, works and screws into the beam, grasping the quadrant between its shoulder and the beam, for the purpose of setting the wheel at any angle.

E is a pointer to indicate at what angle the wheel B is set. The object of this arrangement is to be able to so set the wheel B that it will cause the machine to describe or cut any circle desired.

On the upper face of the beam A, and about the middle of the same, is mounted a triangle, F, the base terminating in a graduated sector, its circular edge being down. From the apex of the triangle F is suspended a plumb, $f'$, from which extends a finger, $f^2$. The said plumb swings on the rear side of the circular brace $f^3$, while the finger swings on the front face of the same. This is to prevent lateral play of the plumb and finger. The purpose of the last above-described arrangement is to enable the operator to ascertain the grade of the ground over which he is moving the instrument.

In the perpendicular slot $g$ in the rear end of the horizontal beam A is journaled a wheel, H. This wheel is sixteen and one-half feet in circumference, and is marked off in feet, except the one-half foot, which is indicated by the ½-mark. At this ½-mark is a pin, H, protruding from the side of the wheel, which snaps the wire spring $h'$ each time the wheel makes a revolution. Each time that this wire spring $h$ is snapped it pulls down the wire $h^2$, the upper end of which is connected with a registering device, $h^3$. Thus each revolution of the wheel H is registered, and when the operator comes to the end of a line he can see by looking at his register how many revolutions the wheel has made. I do not confine myself to this particular size of wheel. From the periphery of this wheel H extend pins $h^4$, which are one foot apart, except the pin at the one-half-foot mark. They secure the rotation of the wheel, and also leave a track that may be traced, if necessary.

To the rear end of the beam A is secured a scraper, I, which loosely embraces the rim of the wheel and cleans from it all trash, dirt, &c., that may adhere to it as it is revolved. This scraper has an outward bend, $i$, for the pin $h$ to pass under, and a rear outward bend, $i'$, for the pins $h^4$ to pass under.

Immediately in the rear of the registering device is a surveyor's compass, K, provided with sights $k$, and with a longitudinal level,$k'$, and a cross-level, $k^2$, the purpose of which need not be explained. On the right side of the instrument are two knobs, L, by means of which the machine is held and guided.

Having thus fully described my invention, what I claim as new, and desire to secure by Letters Patent, is—

1. In a surveying and measuring instrument, as above described, the combination of the beam A, wheel B, journaled in fork C, fork C, pivoted in beam A, quadrant D, having the arms $d$ and slot $d'$, thumb-screw $d^2$, finger E, wheel H, journaled in the rear end of said beam A, and the surveyor's compass K, substantially as shown and described, and for the purposes set forth.

2. In a surveying and measuring instrument, as above described, the combination, with the wheel B, fork C, quadrant D, beam A, and wheel H, of triangle F, having the brace $f^3$, mounted on the upper face of beam A, its base terminating in the graduated sector $f$, plumb $f'$, suspended from the apex of said triangle, and finger $f^2$, pending from said plumb, substantially as shown and described.

3. In a surveying and measuring instrument, as above described, the combination, with the wheel B, fork C, quadrant D, pointer E, triangle F, sector $f$, and plumb and finger $f' f^2$, of wheel H, journaled in the slot $g$ of the beam A, having the pins $h^4$, pin $h$, spring-wire $h'$, wire $h^2$, and registering device $h^3$, substantially as shown and described.

4. In a surveying and measuring instrument, as above described, the combination of the wheel B, fork C, quadrant D, wheel H, and surveyor's compass K, register $h^3$, wire $h^2$, spring-wire $h'$, and pin $h$, projecting from the face of wheel H, substantially as shown and described.

5. In a surveying and measuring instrument, as above described, the scraper I, secured to the rear end of the beam A and loosely embracing the rim of the wheel H, and having the outward bends $i$ and $i'$, substantially as shown and described, and for the purpose set forth.

6. The surveying and grading, leveling, and land-measuring instrument, consisting of the front wheel, B, journaled in the upright fork C, the said fork C, pivoted in the horizontal beam A, quadrant D, secured to said fork C and working on the upper face of said beam A, and adapted to be set by thumb-screw $d^2$, triangle F, mounted on the upper face of beam A, and having the graduated sector $f$ and plumb and fingers $f' f^2$, wheel H, journaled in the rear end of beam A, having pins $h^4$ rising from its periphery, and pin $h$ projecting from the side of its rim, spring-wire $h'$, secured to same beam A and operated by said pin $h$, wire $h^2$, and register $h^3$, operated by said wire $h^2$, surveyor's compass K, attached to said beam A, and scraper I, attached to said beam A and loosely embracing the rim of said wheel H, all substantially as shown and described, and for the purpose set forth.

In testimony whereof I affix my signature in presence of two witnesses.

LUTHER R. HOLLINGSWORTH.

Witnesses:
R. F. ELGIN,
H. STAINTON.